United States Patent
Statia et al.

(10) Patent No.: US 12,149,639 B2
(45) Date of Patent: *Nov. 19, 2024

(54) SECURELY ROTATING A SERVER CERTIFICATE

(71) Applicant: Microsoft Technology Licensing, LLC, Redmond, WA (US)

(72) Inventors: Jeromy Scott Statia, Arlington, WA (US); Chunsheng Yang, Bellevue, WA (US); Priyanka Vilas Deo, Redmond, WA (US); Elizabeth Anne Phippen, Bothell, WA (US); Bradley Scott Turner, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,349

(22) Filed: Mar. 3, 2023

(65) Prior Publication Data
US 2023/0208655 A1 Jun. 29, 2023

Related U.S. Application Data

(63) Continuation of application No. 16/736,758, filed on Jan. 7, 2020, now Pat. No. 11,601,289.

(51) Int. Cl.
*H04L 9/32* (2006.01)
*H04L 9/40* (2022.01)
*H04L 67/51* (2022.01)

(52) U.S. Cl.
CPC .......... *H04L 9/3268* (2013.01); *H04L 9/3265* (2013.01); *H04L 63/08* (2013.01); *H04L 67/51* (2022.05)

(58) Field of Classification Search
CPC ..... H04L 9/3268; H04L 67/51; H04L 9/3265; H04L 9/32; H04L 63/08; H04L 63/0823
See application file for complete search history.

(56) References Cited

U.S. PATENT DOCUMENTS

| | | | | |
|---|---|---|---|---|
| 6,611,869 | B1 * | 8/2003 | Eschelbeck | H04L 63/0823 713/168 |
| 6,816,900 | B1 * | 11/2004 | Vogel | H04L 63/0823 713/156 |
| 10,169,587 | B1 * | 1/2019 | Nix | H04W 12/041 |
| 10,587,582 | B2 * | 3/2020 | Deriso | H04L 63/029 |
| 2003/0182549 | A1 * | 9/2003 | Hallin | H04L 63/0823 713/156 |

(Continued)

*Primary Examiner* — Shanto Abedin
(74) *Attorney, Agent, or Firm* — Ray Quinney & Nebeker; James Bullough

(57) ABSTRACT

The present disclosure relates to systems, methods, and computer-readable media for enhancing security of communications between instances of clients and servers while enabling rotation of server certificates (e.g., X.509 certificates). The systems described herein involve updating a client list of server certificates (e.g., a certificate thumbprint) without reconfiguring or re-installing a client and/or server application, starting a new session (e.g., a hypertext transfer protocol secure (HTTPS) session), or deploying new code. The systems described herein may passively or actively update a client list of certificates to enable a client to security verify an identity of a server instance in a non-invasive way that boosts security from man-in-the-middle types of attacks.

20 Claims, 7 Drawing Sheets

(56) References Cited

U.S. PATENT DOCUMENTS

| | | | |
|---|---|---|---|
| 2005/0071630 A1* | 3/2005 | Thornton | H04L 9/3226 |
| | | | 713/156 |
| 2007/0297396 A1* | 12/2007 | Eldar | H04L 63/08 |
| | | | 370/356 |
| 2010/0263025 A1* | 10/2010 | Neitzel | H04L 63/105 |
| | | | 726/4 |
| 2016/0344725 A1* | 11/2016 | Severin | H04L 63/0823 |
| 2016/0352840 A1* | 12/2016 | Negron | H04L 63/083 |
| 2019/0068581 A1* | 2/2019 | Yamamoto | H04L 9/0891 |

* cited by examiner

SECURELY ROTATING A SERVER CERTIFICATE

CROSS REFERENCE TO RELATED APPLICATIONS

This application is a Continuation of U.S. application Ser. No. 16/736,758, filed on Jan. 7, 2020, the entirety of which is incorporated herein by reference.

BACKGROUND

Recent years have seen rapid development in computing and communication technology, particularly in the capabilities of electronic devices to communicate with one another over various network environments. For example, electronic devices can communicate with other devices over local networks, remote networks, cloud computing systems and other computing environments. In addition, with cloud computing and other remote computing services becoming increasingly common, security of information transmitted between devices has similarly become increasingly important. Indeed, as malicious actors attempting to intercept or otherwise hijack communications between devices has become more common, enhancing security of communications between devices has become increasingly important.

Many conventional communication systems have attempted to avoid or deter malicious actors by implementing secure communication protocols (e.g., hypertext transfer protocol secure (HTTPS)) that are rooted in trust of certificates used to sign communications between devices. For example, upon deploying code, many communication systems implement a certificate thumbprint on one or more clients that may be used to verify whether a communication originates from a trusted source (e.g., a trusted server). In this way, clients may confidently send and receive information from servers associated with a trusted certificate.

While certificate authorization and thumbprinting provide useful tools for preventing certain attacks from malicious actors (e.g., man-in-the-middle attacks), these techniques for preventing information from being compromised has a number of problems and drawbacks. For example, where malicious actors are able to obtain valid certificates from one or more certificate authorities, malicious actors are often able to convince clients that communications to and from the malicious actor (e.g., a malicious server) should be trusted. In addition, where implementing a certificate thumbprint may provide additional security, conventional techniques for rotating or updating credentials generally involves reconfiguring a client and/or server application, deploying new code to any number of clients, exposing clients and/or servers to additional security risks, and/or potentially rendering a service dysfunctional for a number of clients.

These and other problems exist in connection with enhancing secure communication between clients and servers.

DETAILED DESCRIPTION

Figure 1:
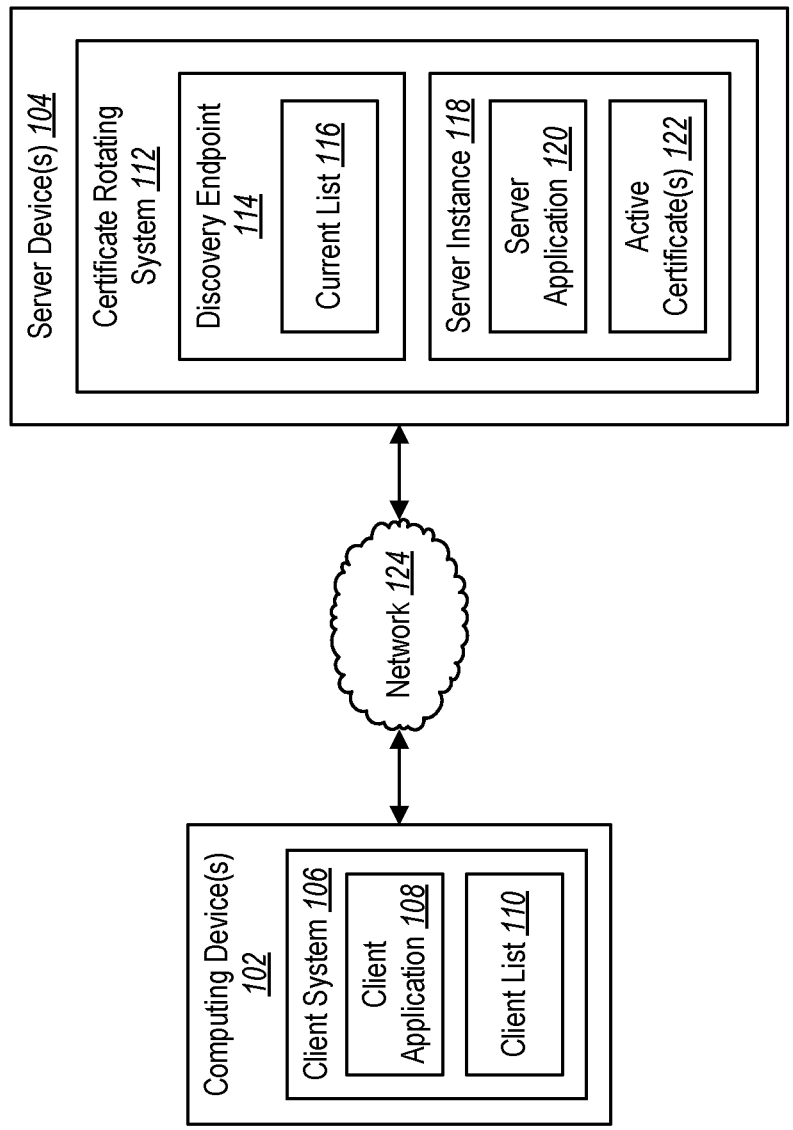
FIG. 1 illustrates an example environment including a certificate rotating system in accordance with one or more embodiments.

The present disclosure relates to a certificate rotating system for enhancing security of communications between a client and server (e.g., server instance) while enabling rotation of server certificates on the server and/or client. In particular, one or more embodiments of the certificate rotating system includes features and functionality for updating a client list of server certificates (e.g., a certificate thumbprint) without reconfiguring or re-installing a client, starting a new session, deploying additional code, or other process that risks causing an application to cease functioning on a client. Indeed, as will be discussed in further detail below, the certificate rotating system can utilize a discovery endpoint to provide a current or updated list of server certificates that is cryptographically verifiable as a trusted list of server certificates by a client.

In one or more embodiments, the certificate rotating system enables a client to actively update a client list. For example, upon receiving a call response from a server instance and determining that a server certificate from the server instance does not match a client list of trusted certificates accessible to a client, the client can interact with a discovery endpoint to obtain a current list of active certificates for the server instance. The client may utilize the client list to attest to the current list of active certificates and, based on attesting the current list received from the discovery endpoint, can update a client list to include one or more additional server certificates that the client can trust to verify an identity of the server instance going forward.

As another example, in one or more embodiments, the certificate rotating system enables a client to passively update a client list. For example, where a server instance periodically updates a server certificate (e.g., without informing one or more clients), the server instance can upload a new server certificate to a discovery endpoint prior to using the new server certificate. Independent of this process, the client can periodically request an updated list of certificates from the discovery endpoint. Where the current list has been updated between periodic requests, the discovery endpoint can provide an updated list including the new server certificate. Similar to the active update example discussed above, the client can utilize the client list to attest to the current list including the new certificate(s) and update the client list to include the new server certificate.

The present disclosure includes a number of practical applications that provide benefits and/or solve one or more problems associated with securely rotating server certificates on a server instance in such a way that enables the client to recognize one or more new or updated server certificates. For example, by utilizing a discovery endpoint that provides a cryptographically provable list of server certificates, the certificate rotating system enables a client to periodically update a client list of server certificates without deploying additional code and/or reconfiguring the server and/or client. Indeed, rather than re-deploying new code with an updated list in a computationally prohibitive and/or time-consuming process, the certificate rotating system can simply provide an updated list that the client is capable of verifying locally based on one or more previously received and trusted server certificates.

In addition to providing a non-invasive way to rotate a server certificate, the certificate rotating system additionally provides significant scalability to existing environments for rotating server certificates across multiple clients. For example, and as will be discussed in further detail below, by providing a current list to a plurality of clients via a discovery endpoint, multiple clients having access to client lists at different stages of update can receive a current list that has been updated one or multiple times and verify the update against any client list on any one of the clients. In this way, even where a server instance has rotated a server certificate multiple times since previously communicating with a particular client, the client may nonetheless verify a current list including multiple new server certificates and update a corresponding client list to include each of the additional server certificates. In addition, a computing environment (e.g., a cloud computing system) may configure or deploy any number of clients to communicate with a particular server instance by simply employing whatever current list of server signatures exist at a time that each of the clients are deployed.

In addition to enhancing scalability and convenience to rotating server certificates, the certificate rotating system additionally enables the server instance to rotate server certificates without compromising the fragility of a certificate thumbprint authorization process. For example, where conventional systems avoid certificate updates until the last possible moment to avoid the risk associating with rendering one or more of a collection of clients as inoperable as a result of the client(s) not having access to an up to date list of certificates, the certificate rotating system may reduce fragility of a computing environment by enabling any client at any update status to verify a current list with the client list currently accessible to the client.

In addition to each of the above benefits, features and functionality described herein provide a secure form of communication between a client and server while preventing many known man-in-the-middle types of attacks. For example, even where a malicious device is able to obtain a valid certificate, the certificate identifier of the malicious server will not match the local list on the client. Moreover, even where a malicious actor establishes a malicious discovery endpoint that receives a request from a client, the malicious discovery endpoint would not have access to a current list that includes those server certificates on the client and would therefore be unable to sign (e.g., use a certificate private key to provide a digital signature to be validated using a certificate public key) any list provided to the client with a certificate that is trusted by the client.

As illustrated in the foregoing discussion, the present disclosure utilizes a variety of terms to describe features and advantages of a certificate rotating system. Additional detail will now be provided regarding the meaning of some of these terms. For example, as used herein, a "client" or "client system" may refer to a consumer (e.g., an HTTPS consumer) of content associated with a server. A client may refer to a client device, a server device, or other computing device. In addition, a client may refer to software or hardware that leverages HTTPS to secure a session between the client and a server instance.

As used herein, a "server" or "server instance" may refer interchangeably to a service, resource, an application program interface (API), endpoint, or other computing construct capable of responding to a call from a client. In one or more embodiments described herein, a server refers to a server instance on a cloud computing system, such as a virtual machine, container, or other cloud computing resource. In one or more embodiments described herein, a server refers to an HTTPS server capable of responding to HTTPS calls received from an HTTPS client. Similar to the client, a server may refer to an instance of hardware and/or software capable of leveraging HTTPS to secure a session between the server and client.

One or more embodiments of the client and/or server may be implemented on a computing device, such as a client device or a server device. As used herein, a "computing device" may refer to any portable or non-portable computing device such as a mobile device, a laptop, desktop, server node, or other device capable of hosting a client. In one or more embodiments, a computing device and/or server device may refer to a computing node or other hardware device(s) on a cloud computing system. Additional information in connection with a computing device and/or server device is described generally below in connection with FIG. 7.

As used herein, a "discovery endpoint" refers to any domain or endpoint in which a call addressed to the associated endpoint involves returning a data object in response to the call. For example, and as will be discussed in further detail below, the discovery endpoint may refer to an HTTPS endpoint in which a data object is returned by a call that lands on a web API and which is cryptographically signed by a server certificate associated with a corresponding server instance. Similar to the client and server instance, the discovery endpoint may be implemented on a computing device (e.g., a server device). In one or more embodiments, the discovery endpoint is implemented on the same server device as one or more server instances (e.g., as shown in FIG. 1). Alternatively, in one or more embodiments, the discovery endpoint is implemented on a different device as a corresponding server instance.

As used herein, a "server certificate" refers to any data that may be used to identify a source of a communication. For example, in one or more embodiments, a server certificate refers to a certificate granted by a certificate authority. As another example, a server certificate may refer to metadata associated with a server certificate including, but not limited to a certificate thumbprint, a subject alternative name, a user principal name, a serial number, an issuer name, etc. Indeed, as used herein, a server certificate can refer to any metadata contained within data (e.g., a payload), or extension blocks of a public key used individually or in combination to uniquely identify an entity (e.g., a server instance, a client). In one or more examples described herein, a server certificate specifically refers to a tracking thumbprint.

In one or more embodiments described herein, a server certificate may be used to sign a payload of a communication (e.g., a list of server certificates). Where a client has access to a matching certificate, this may be used to verify that a communication originates from the server instance rather than from other not trusted source(s). Server certificates may have a variety of formats and protocols. For example, in one or more implementations described herein, a server certificate refers to an X.509 digital certificate (e.g., an X.509 v3 digital certificate), a transport security layer (TLS) certificate, a secure sockets layer (SSL) certificate, or any HTTPS certificate.

As will be discussed in further detail herein, one or more lists of server certificates may be implemented on different devices. For example, a "client list" may refer to a list of server certificates on the same device as a client or on a storage device that is otherwise accessible to the client. In one or more embodiments described herein, a client list may be referred to as a certificate thumbprint. Further, a "current list" may refer to a list of server certificates that includes a root list (e.g., an initial list at deployment of a server instance and/or client) and any additional server certificates that have been valid for the server instance at some point after initiating the server instance. Moreover, a "new certificate" or "active certificate" may refer to any server certificate used by a server instance to sign one or more communications transmitted by the server instance.

Additional detail will now be provided regarding a certificate rotating system in relation to illustrative figures portraying example implementations. For example, FIG. 1 illustrates an example environment 100 for rotating a server certificate in accordance with one or more embodiments. As shown in FIG. 1, the environment 100 includes one or more computing device(s) 102 and one or more server device(s) 104. As further shown, the computing device(s) 102 includes a client system 106 (e.g., a client) implemented thereon. The client system 106 may include a client application 108 and a client list 110.

In accordance with one or more embodiments discussed above, the client system 106 may refer to any client, such as an HTTPS client that transmits an HTTPS call to the server device(s) 104. The client application 108 may refer to any code or program that runs within the client system 106. For example, the client application 108 may refer to a web browser, operating system, or any program or service (e.g., cloud-computing service) that runs on a client system 106.

In addition, the client list 110 may refer to a list of server certificates (e.g., a certificate thumbprint) stored on the computing device(s) 102 or that is otherwise accessible to a client system 106. The client list 110 may refer to a root list or a root thumbprint representative of an initial list of server certificates at a time of initial deployment or installation of the client system 106. In addition, the client list 110 may refer to any current iteration of server certificates previously updated on the client system 106 based on a state of the current list 116 on the server device(s) 104 at a time when the client list 110 was previously updated.

As shown in FIG. 1, the server device(s) 104 may include a certificate rotating system 112 implemented thereon. The certificate rotating system 112 may include a discovery endpoint 114 having a current list 116 thereon (e.g., stored on or otherwise accessible to the discovery endpoint 114). As mentioned above, the discovery endpoint 114 may refer to an HTTPS endpoint or any endpoint in which a data object is returned in response to a discovery request landing on the discovery endpoint 114. The current list 116 may refer to a list of server certificates uploaded to the discovery endpoint 114 by the server instance 118. For instance, the current list 116 may include a root list in addition to any number of additional server certificates uploaded to the discovery endpoint 114 as the server instance 118 rotates or updates server certificates.

As further shown in FIG. 1, the server device(s) 104 may include a server instance 118 (or multiple instances). The server instance 118 may include a server application 120, which may refer to any code or program that runs within the server instance 118. The server application 120 may include similar features as the client application 108 on the client system 106.

As further shown, the server instance 118 may include an active certificate 122 representative of a current certificate that is new, valid, and/or currently in use by the server instance 118. For example, in response to receiving a server call from the client system 106, the server instance 118 may transmit a call response including the active certificate 122 to verify an identity of the server instance 118 to the client system 106. As will be discussed in further detail below, the client system 106 may utilize the active certificate 122 in connection with the client list 110 and the discovery endpoint 114 to confirm an identity of the server instance 118 as well as update the client list 110 to reflect a set of server signatures from the current list 116 on the discovery endpoint 114.

As further shown in FIG. 1, the computing device(s) 102 and the server device(s) 104 may communicate via a network 124. The network 124 may include one or multiple networks that use one or more communication protocols or technologies for transmitting data. For example, the network 124 may utilize transport layer security (TLS), secure sockets layer (SSL), or any HTTPS protocol for transmitting data between devices of the environment 100. In one or more embodiments, the network 124 includes the Internet or another data link that enables transport of electronic data between the computing device(s) 102 and the server device(s) 104. In one or more embodiments, the client system 106 and certificate rotating system 112 are each implemented on the same or different cloud computing systems and communicate over one or more networks that facilitate transfer of data between nodes of the cloud computing system.

While FIG. 1 illustrates an example in which the client system 106 is implemented on a computing device 102 while the discovery endpoint 114 and server instance 118 are implemented on a server device, this arrangement of devices and components are provided by way of example. As an example, in one or more embodiments, the client system 106 and server instance 118 are implemented on the same cloud computing system or a common network of computing devices. In addition, or as an alternative, in one or more embodiments, the discovery endpoint 114 and the server instance 118 are implemented on different server devices. Nevertheless, features and functionality described herein in connection with the various components illustrated in FIG. 1 may apply to similar components on different arrangements of devices.

Figure 2:
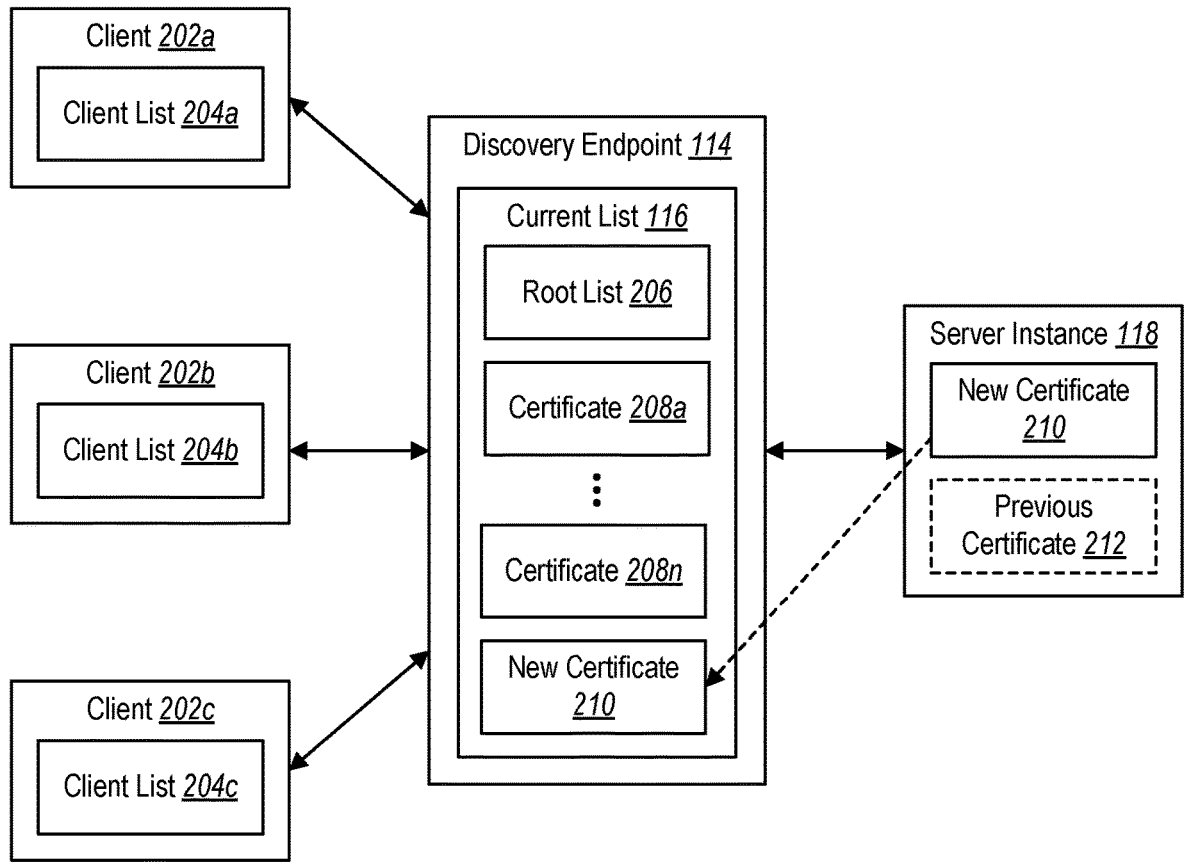
FIG. 2 illustrates an example implementation of updating a current list of a discovery endpoint in accordance with one or more embodiments.

FIG. 2 illustrates an example implementation of a plurality of clients, a discovery endpoint, and a server instance in accordance with one or more embodiments. In particular, FIG. 2 illustrates a plurality of clients 202a-202c in communication with a discovery endpoint 114 and a server instance 118. Each of the clients 202a-202c may have client lists 204a-c implemented thereon and may include similar features as the client system 106 discussed above in connection with FIG. 1. In addition, each of the discovery endpoint 114 and the server instance 118 may have similar features and functionality as corresponding components discussed above in connection with FIG. 1. For ease in explanation, the plurality of clients 202a-c includes a first client 202a having a first client list 204a, a second client 202b having a second client list 204b, and a third client 202c having a third client list 204c. Nevertheless, other implementations may include any number of clients having client lists implemented thereon.

As shown in FIG. 2, the current list 116 on the discovery endpoint 114 (or stored on a device associated with the discovery endpoint 114) may include any number of server certificates corresponding to server certificates that are currently or have previously been owned by the server instance 118. Each of the server certificates may represent a certificate that is currently or was previously active or otherwise valid for verifying an identity of the server instance 118. As shown in FIG. 2, the current list includes a root list 206 representative of an initial list of one or more server certificates issued for the server instance 118 (e.g., at a time that the server instance 118 was first deployed and/or recognized by a certificate authority). The current list 116 may further include additional certificates 208a-n that were previously uploaded to the discovery endpoint 114 over time. Moreover, the current list 116 may include a new certificate 210 corresponding to a new or active certificate that has been issued (e.g., by a certificate authority) for the server instance 118.

The new certificate 210 may represent a current certificate that has been issued for the server instance 118 and which may be used to verify an identity of the server instance 118 as soon as the new certificate 210 is provided (e.g. uploaded) to the discovery endpoint 114. For example, the server instance 118 may rotate certificates by obtaining a new certificate 210 to replace a previous certificate 212. Upon receiving the new certificate 210, the server instance 118 may upload the new certificate 210 to the discovery endpoint 114 to be included within the current list 116. The server instance 118 may begin using the new certificate 210 in lieu of the previous certificate 212 to sign communications or otherwise indicate an identity of the server instance 118 to the clients 202a-c.

While not explicitly shown in FIG. 2, the previous certificate 212 may be included within the current list 116 based on the server instance 118 previously uploading the previous certificate 212 to the discovery endpoint 114. As such, the current list 116 may include the previous certificate 212. For instance, the previous certificate 212 may be included within the root list 206 or may refer to one of the additional certificates 208a-n that have been added to the current list 116 at some point subsequent to the root list 206 and prior to uploading the new certificate 210 to the discovery endpoint 114.

In one or more embodiments, the server instance 118 provides an additional layer of security by signing the new certificate 210 provided to the discovery endpoint 114 with an old certificate included within the current list 116. For example, the server instance 118 may use an old private key of the previous certificate (or of some older certificate) when signing a certificate thumbprint to prove presence of the new certificate 210 and the previous certificate 212 on the server instance 118 before uploading the new certificate 210 to the discovery endpoint 114. In this way, the discovery endpoint 114 may have an additional layer of trust for the new certificate 210, thus enhancing overall security of communications between the clients 202a-c and the server instance 118.

As mentioned above, and as shown in FIG. 2, each of the clients 202a-c have a corresponding client list 204a-c. The client lists 204a-c may include the same or different sets of server certificates. For example, each of the client lists 204a-c may include the root list 206 or a root certificate thumbprint representative of an initial set of one or more server certificates that were delivered to the clients 202a-c upon deployment of the clients 202a-c and/or server instance 118. Further, one or more of the client lists 204a-c may include additional server certificates that have been updated by the server instance over time 118 (e.g., at different times).

As an illustrative example, each of the client lists 204a-n may represent different stages of updates corresponding to different iterations of the current list 116 at different points in time. For example, the first client list 204a may not have been updated since initially receiving and storing the client list 204a. As a result, the first client list 204a may include only the root list 206 without any of the additional certificates 208a-n or the new certificate 210. Meanwhile, the second client 202b may have been updated more recently (though not prior to the new certificate 210 being added) and includes both the root list 206 and each of the additional certificates 208a-n (or some subset of the additional certificates 208a-n). The third client 202c may have been updated most recently and after the new certificate 210 has been added to the current list 116. As a result, the third client list 204c may include the same set of server certificates as the current list 116 on the discovery endpoint 114.

Additional detail will now be given in connection with example implementations for updating a client list. In particular, FIG. 3 illustrates an example in which a client (e.g., a client system 106) actively updates a client list based on a detected mismatch between a server certificate received in connection with a call response and a current iteration of a client list accessible to the client.

Figure 3:
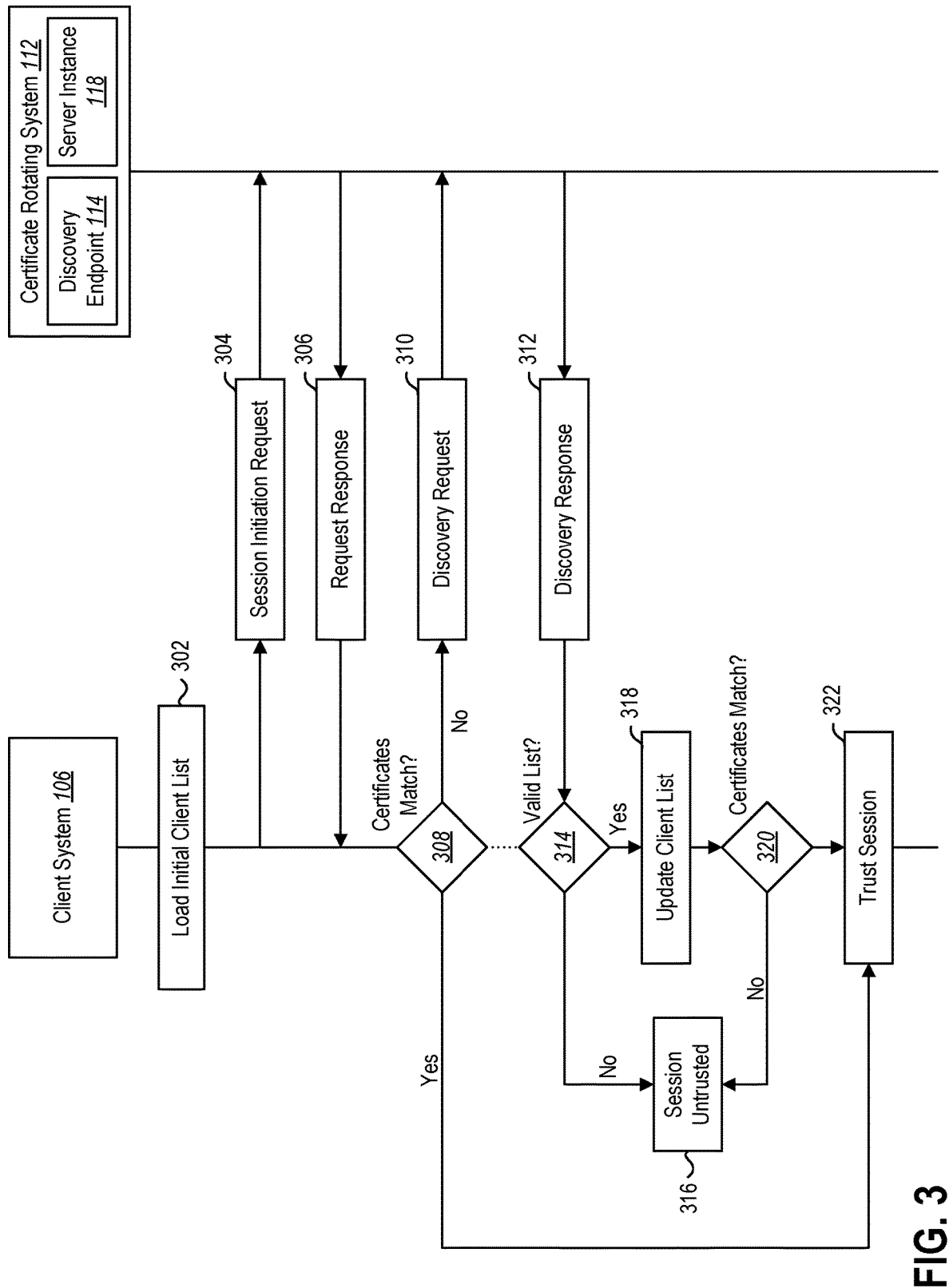
FIG. 3 illustrates an example implementation for actively updating a client list of server certificates in accordance with one or more embodiments.

For example, as shown in FIG. 3, a client system 106 can perform an act 302 of loading an initial client list. In one or more embodiments, the initial client list refers to a root list corresponding to an initial list of one or more server certificates associated with the server instance 118 at initial deployment of the server instance 118. Alternatively, where the client system 106 is first installed at some later time after additional certificates have been added to a current list on the discovery endpoint 114, the initial client list may refer to the root list or the current list at the time the client system 106 was first appointed or otherwise deployed in a computing environment.

As further shown, the client system 106 can perform an act 304 of providing a session initiation request to the certificate rotating system 112. For example, the client system 106 can provide the session initiation request to the server instance 118. In response, the certificate rotating system 112 can perform an act 306 of providing a request response to the client system 106. For example, the server instance 118 can response to the session initiation request and provide the request response to the client system 106. In one or more embodiments, the session initiation request and the request response include an HTTPS server call and an HTTPS server response to the server call. In addition, the acts 304-306 may refer to initial communications between the client system 106 and the server instance 118. Alternatively, these communications may simply refer to the latest communication between the client system 106 and server instance 118.

In providing the request response, the server instance 118 can sign the response with an active or current server certificate in use by the server instance 118. As shown in FIG. 3, the client system 106 can perform an act 308 of determining whether the certificate used to sign the request response matches a certificate included within the initial client list on the client system 106. If a matching certificate is found, the client system 106 may perform an act 322 of trusting the session with the server instance 118 and continue operating as normal without initiating any communication with the discovery endpoint 114.

Alternatively, where the client system 106 determines that the server certificate used to sign the request response does not match any server certificate(s) included within the initial client list (or a current list accessible to the client system 106), the client system 106 can perform an act 310 of providing a discovery request to the certificate rotating system 112. In particular, the client system 106 can provide a discovery request addressed to the discovery endpoint 114 having access to a current list of server certificates representative of a certificate thumbprint that is the most current for the server instance 118. The discovery request may include an HTTPS call to the discovery endpoint 114 requesting a current list of server certificates.

In response to the discovery request, the certificate rotating system 112 can perform an act 312 of providing a discovery response to the client system 106. In one or more embodiments, the discovery endpoint 114 provides the discovery response by returning a data object including a current list or thumbprint representative of the current list to the client system 106.

The discovery response may include a data object including a variety of information. For example, in one or more embodiments, the discovery response may include a full list of valid server certificates. As an alternative to a full list of valid certificates, the discovery response may include a current valid metadata element(s) signed by a most recently trusted certificate. In one or more implementations, the discovery response includes a full chain of valid metadata element(s) signed by each layer of the certificate chain. As another example, the discovery response may include a full certificate chain signed by a previously trusted certificate.

As shown in FIG. 3, the client system 106 can perform an act 314 of determining whether the current list or payload of the returned data object is valid. If the current list is not valid, the client system 106 can perform an act 316 of determining that the session should not be trusted and end communications with the server instance 118.

The client system 106 can determine whether the current list is valid in a number of ways. For example, in one or more embodiments, the client system 106 verifies whether the current list is valid by first determining whether the discovery endpoint 114 returned a valid response. For instance, where the response received from the discovery endpoint 114 does not include a data object or where the response includes an indication that the discovery endpoint is invalid or cannot be found (e.g., an "HTTPS response not found" response), the client system 106 can perform the act 316 of determining that the session should not be trusted.

Where the discovery endpoint 114 and the server instance 118 are on the same server device, the client system 106 may perform additional actions to validate the discovery response. For example, in one or more implementations, the client system 106 may validate the discovery response based on comparing an identifier received from the server instance 118 to an identifier received from the discovery endpoint 114. In particular, the client system 106 can compare an identifier (e.g., the server certificate) used to sign the request response with an identifier (e.g., the server certificate) used to sign the discovery response.

Where the identifiers are the same, this may confirm to the client system 106 that the discovery endpoint 114 and the server instance 118 are on the same server device. This may serve as an additional level of security for the client system 106 to verify that the current list is valid. Where the discovery endpoint 114 and the server instance 118 are known or expected to be on the same server device and where the identifiers associated with the request response and the discovery response are different, the client system 106 can perform the act 316 of determining that the session should not be trusted.

Where the identifiers match, however, or where the discovery endpoint 114 and the server instance 118 are known to be implemented on different servers, the client system 106 may further verify the current list by determining whether a payload included within a data object (e.g., the discovery response) has been signed by a server certificate that is included within the initial client list.

Where the discovery response has been signed by a trusted server certificate (e.g., included in the root list or the client list currently on the client system 106), the client system 106 may determine that the discovery response should be trusted and proceed to perform an act 318 of updating the client list. For example, the client system 106 can replace a previous client list (e.g., the initial client list or any less recent iteration of the client list) with the current list received from the discovery endpoint 114.

In one or more embodiments, the client system 106 additionally performs an act 320 of determining whether at least one server certificate from the updated list matches the server certificate received from the server instance 118. In particular, the client system 106 may compare the updated client list to a certificate used to sign the request response. Where the server certificates do not match, the client system 106 can perform the act 316 of determining to not trust the session. Alternatively, where the server certificate matches at least one server certificate from the updated client list, the client system 106 can perform the act 322 of trusting the session and continue communicating with the server instance 118

While FIG. 3 illustrates an example implementation in which the discovery endpoint 114 and server instance 118 are implemented on the same device (a server device), it will be understood that similar features described in connection with FIG. 3 may apply to an implementation in which the discovery endpoint 114 and the server instance 118 are implemented on different devices. As such one or more of the acts described in connection with the certificate rotating system 112 may be performed by either a discovery endpoint 114 or the server instance 118 on different devices unless explicitly indicated otherwise.

Figure 4:
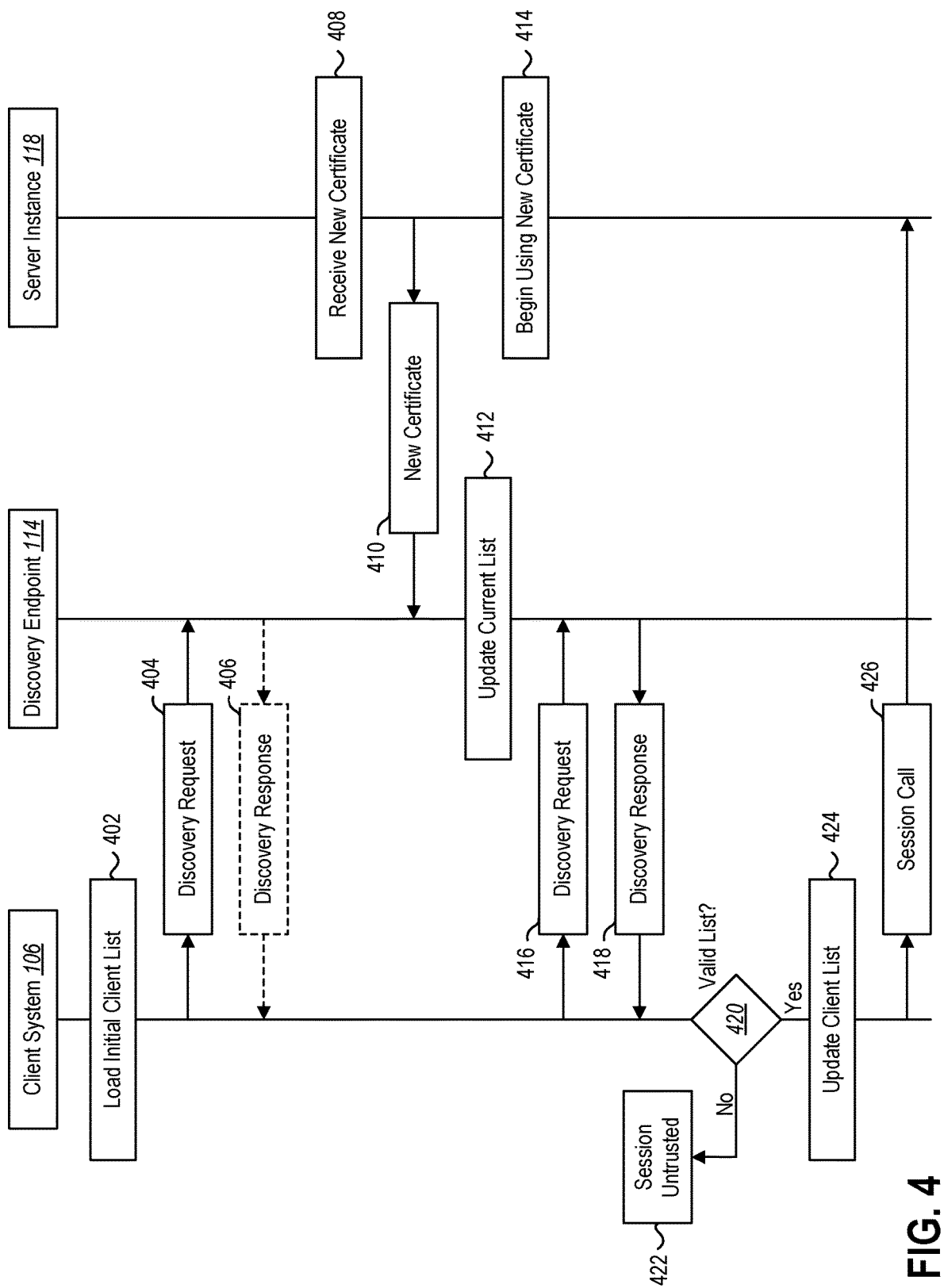
FIG. 4 illustrates an example implementation for passively updating a client list of server certificates in accordance with one or more embodiments.

Moving on, FIG. 4 illustrates another example implementation of the certificate rotating system 112 for updating a client list. For example, while FIG. 3 illustrates a technique for actively updating the client list, FIG. 4 illustrates an example in which the client system 106 and certificate rotating system 112 may passively update the client list to ensure that the client system 106 has an updated list in response to a call from a server instance 118. In particular, FIG. 3 illustrates an example in which the client system 106 passively queries the discovery endpoint 114 (e.g., without being prompted by a detected a mismatch within a session call from the server instance 118) and periodically updates the client list.

As shown in FIG. 4, the client system 106 can perform an act 402 of loading an initial client list. The initial client list may refer to a root list corresponding to an initial list of server certificates at a time when the server instance 118 was initially deployed. The initial list may alternatively refer to any iteration of the current list of server certificates as maintained on the discovery endpoint 114 at a time when the client system 106 was first appointed or deployed in a computing environment.

As further shown, the client system 106 can perform an act 404 of providing a discovery request to the discovery endpoint 114. For example, the client system 106 can transmit an HTTPS call to the discovery endpoint 114 including a request to return a current list or thumbprint representative of the current list. The client system 106 can transmit the discovery request as part of a setting or configuration to periodically request an updated list. For example, in accordance with a setting or configuration of the client system 106, the client system 106 can send a discovery request on a periodic schedule (e.g., daily, weekly, monthly) to optimally obtain a current version of the current list that includes any new certificates that may be in use by the server instance 118 since performing any previous client list updates. Providing the discovery request may be done independent of any interactions between the client system 106 and the server instance 118.

As shown in FIG. 4, the discovery endpoint 114 may perform an act 406 of providing a discovery response. Where a current list has not been recently updated (e.g., where the current list has not been updated since receiving a previous discovery request from the client system 106), the discovery response may include an indication that no updates have been made. As an alternative to responding with the indication that no updates have been made, the discovery endpoint 114 may simply not respond (e.g., where the current list has not been recently updated).

In one or more embodiments, the discovery endpoint 114 may respond by providing a current list on the discovery endpoint 114. Based on the current list not being recently updated, at least since loading the initial client list, the client system 106 can determine that the received current list matches the client list and either replace the client list with an identical list (e.g., assuming it is validated that the current list matches the client list and/or is still trusted) or simply discard the received list from the discovery endpoint 114.

As shown in FIG. 4, the server instance 118 may perform an act 408 of receiving a new certificate (or multiple certificates). The server instance 118 may receive the new certificate from a certificate authority to enable the server instance 118 to rotate an active server certificate on the server instance 118 which may be used in session calls to the client system 106 (and to other clients) originating from the server instance 118.

Prior to using the new certificate, the server instance 118 can perform an act 410 of providing the new certificate to the discovery endpoint 114. For example, the server instance 118 can upload the new certificate to the discovery endpoint 114. In one or more embodiments, the server instance 118 provides the new certificate to be added to an existing current list on the discovery endpoint 114. In one or more embodiments, the server instance 118 provides an update list including all server certificates that are currently valid or that have been previously valid for the server instance 118.

The discovery endpoint 114 can perform an act 412 of updating a current list. For example, the discovery endpoint 114 can append the new certificate to a current list to include the new certificate. The discovery endpoint 114 can begin distributing the updated current list, as will be discussed in further detail below. After the discovery endpoint 114 has updated the current list to include the new certificate, the server instance 118 may perform an act 414 of beginning to use the new certificate. In particular, the server instance 118 may begin signing communications and payloads with the new certificate when communicating with the client system 106 (and other clients).

Similar to act 404 discussed above, the client system 106 can perform an act 416 of providing a discovery request to the discovery endpoint 114. Similar to act 404, the act 416 of providing the discovery request may be a regular or periodic request made by the client system 106 to the discovery endpoint 114. As shown in FIG. 4, the discovery endpoint 114 may respond by performing an act 418 of providing a discovery response to the client system 106. In particular, the discovery endpoint 114 may provide a response including a data object having a current list stored thereon and signed by one of the server certificates from the initial client list.

In response to receiving the discovery response, the client system 106 can perform an act 420 of determining whether the current list (e.g., within the data object) received from the discovery endpoint 114 is a valid list. In particular, the client system 106 can verify whether the discovery response received from the discovery endpoint 114 was signed with a trusted server certificate included within the initial client list. Where the client system 106 determines that the current list is not valid or cannot be trusted, the client system 106 may perform an act 422 of determining that a session with the server instance 118 should not be trusted and/or that the discovery endpoint 114 does not correspond to the server instance 118.

Alternatively, where the client system 106 determines that the received data object from the discovery point 114 is valid, the client system 106 can perform an act 424 of updating the client list to reflect the current list on the discovery endpoint 114. In particular, the client system 106 can update a client list to include both the initial client list (e.g., a root list) and the new certificate and/or any additional certificates stored by the discovery endpoint 114.

As shown in FIG. 4, the client system 106 may perform an act 426 of providing a session call (e.g., a session initiation request) to the server instance 118 to initiate and/or continue a communication session with the server instance 118. While not shown in FIG. 4, the server instance 118 may sign one or more responses with the new certificate, which may now be verified using the updated client list on the client system 106.

It will be appreciated that FIGS. 3 and 4 illustrate example implementations to demonstrate features and functionality of the client system 106 and respective components of the certificate rotating system 112 and that specific acts and features described in connection with individual implementations should not be construed as exclusive to those implementations. For example, while FIG. 3 illustrates an example in which the discovery endpoint 114 and server instance 118 are implemented on a certificate rotating system 112 on a single server device, a similar series of acts may be performed using a discovery endpoint 114 and server instance 118 implemented on different devices. As another example, while FIG. 4 illustrates an example in which the discovery endpoint 114 and server instance 118 may be implemented on two different server devices, a similar series of acts may be performed using a discovery endpoint 114 and server instance 118 implemented on the same server device.

Moreover, while FIG. 3 illustrates an example implementation in which the client system 106 and certificate rotating system 112 cooperatively perform an active method for updating a client list to reflect a current list of server certificates on the discovery endpoint 114, many of the acts described in connection with FIG. 3 may be integrated as an addition or alternative to acts described in connection with FIG. 4, which relates to a passive method for updating the client list. As a non-limiting example, where a session call or session initiation request (e.g., as described in FIG. 3) is provided between periodic discovery requests (e.g., as described in FIG. 4) and after the server instance 118 has begun using a new certificate that is not yet reflected within a local client list, the client system 106 and certificate rotating system 112 may perform acts from the active method described in FIG. 3 in combination with acts from the passive method described in FIG. 4 as part of a process for rotating a server certificate on the server instance 118 and updating the client list on the client system 106.

In addition, while FIGS. 3 and 4 relate specifically to implementations in which a client interacts with a discovery endpoint to obtain a current list of certificates associated with a server instance, similar features and functionality may apply to a server instance obtaining or verifying a certificate for a client. For example, a server instance may implement a similar passive and/or active approach as the client system 106 in FIGS. 3-4 that involves a server instance providing a discovery request to the discovery endpoint 114 in order to obtain and/or validate one or more client certificates.

Figure 5:
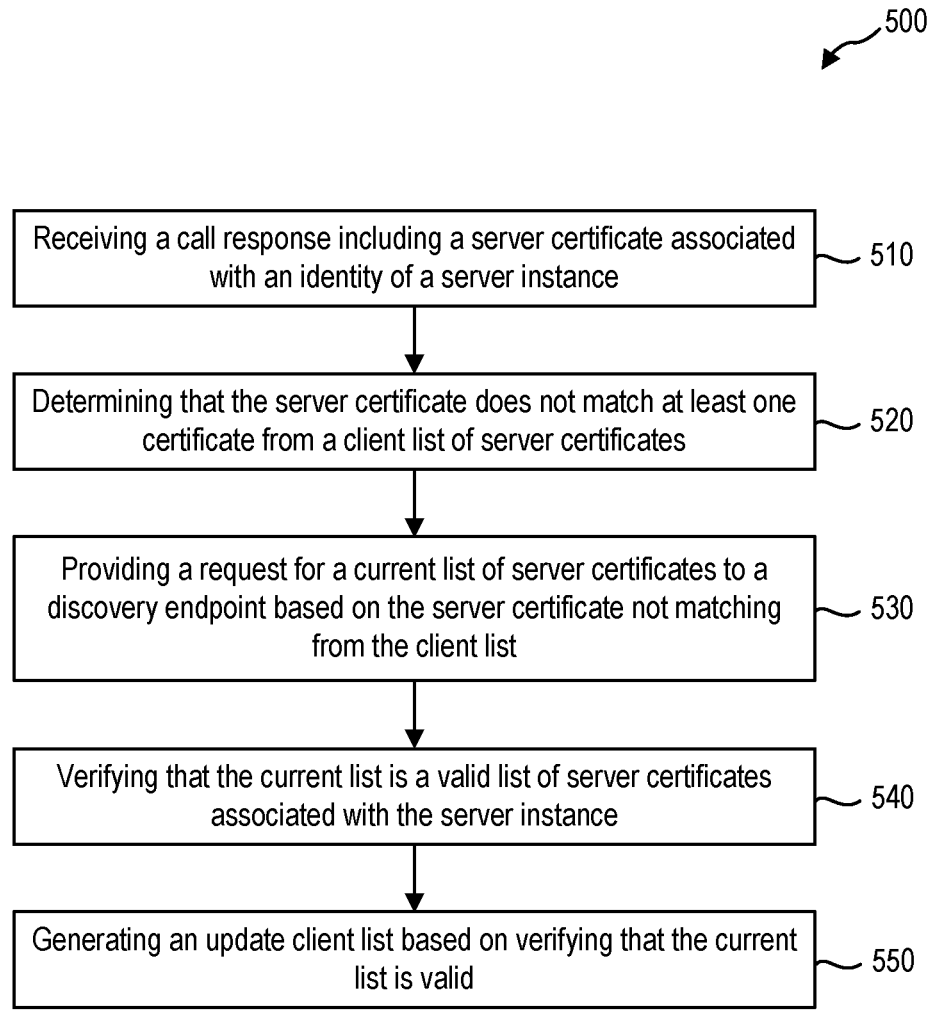
FIG. 5 illustrates an example series of acts for actively updating a client list of server certificates in accordance with one or more embodiments.
Figure 6:
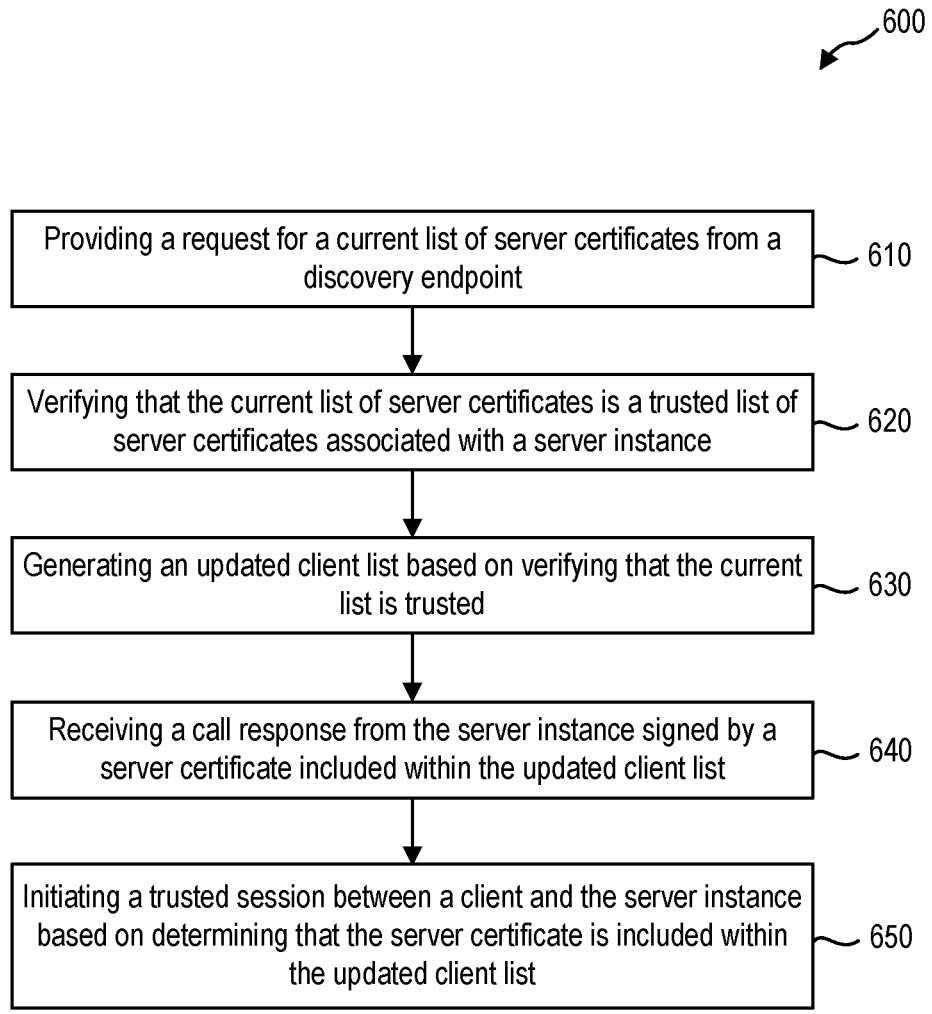
FIG. 6 illustrates an example series of acts for passively updating a client list of server certificates in accordance with one or more embodiments.

Turning now to FIGS. 5-6, these figures illustrates an example flowchart including a series of acts for rotating server certificates for a server instance. While FIGS. 5-6 illustrates acts according to one or more embodiments, alternative embodiments may omit, add to, reorder, and/or modify any of the acts shown in FIGS. 5-6. The acts of FIG. 5-6 can be performed as part of a method. Alternatively, a non-transitory computer-readable medium can comprise instructions that, when executed by one or more processors, cause a computing device to perform the acts of FIGS. 5-6. In still further embodiments, a system can perform the acts of FIGS. 5-6.

FIG. 5 illustrates a series of acts 500 related to a process for actively updating a list of server certificates accessible to a client. As shown in FIG. 5, the series of acts 500 includes an act 510 of receiving a call response including a server certificate associated with an identity of a server instance. For example, in one or more embodiments, the act 510 involves receiving, from a server instance, a call response including a server certificate for verifying an identity of the server instance. In one or more embodiments, the client is a hypertext transfer protocol secure (HTTPS) client and the call response received from the server instance includes an HTTPS call response from an HTTPS server in response to a request to initiate a session between the HTTPS client and the HTTPS server.

As further shown, the series of acts 500 includes an act 520 of determining that the server certificate does not match at least one certificate from a client list of server certificates. For example, in one or more embodiments, the act 520 involves determining that the server certificate does not match at least one certificate from a client list of one or more server certificates where the client list includes a local list of server certificates accessible to a client.

In one or more embodiments, the client list includes a root list of one or more X.509 v3 digital certificates owned or previously owned by the server instance. The current list may include the root list of one or more X.509 v3 digital certificates and one or more additional X.509 v3 digital certificates associated with the server instance. In one or more embodiments, the client list is representative of a root list of one or more valid certificates associated with the server instance at a time that the client list was initially deployed to the client. The current list may include the root list and one or more additional certificates uploaded to a discovery endpoint between the time that the client list was initially deployed to the client and another time associated with the client transmitting a call to the server instance. The one or more additional server certificates may correspond to one or more updates of the server instance.

As further shown, the series of acts 500 includes an act 530 of providing a request for a current list of server certificates to a discovery endpoint based on the server certificate not matching from the client list. For example, in one or more embodiments, the act 530 involves providing a request for a current list of certificates to a discovery endpoint not matching the one or more server certificates from the client list. In one or more embodiments, providing the request for the current list includes providing a hypertext transfer protocol secure (HTTPS) call to the discovery endpoint. In one or more embodiments, the discovery endpoint and the server instance are implemented on the same server device.

As further shown, the series of acts 500 includes an act 540 of verifying that the current list is a valid list of server certificates associated with the server instance. For example, in one or more embodiments, the act 540 involves verifying that the current list of certificates associated with the discovery endpoint is a trusted list of server certificates associated with the server instance. In one or more embodiments, verifying the that the current list of certificates associated with the discovery endpoint is a trusted list of server certificates includes determining that a certificate used to sign the current list is included within the client list.

In one or more implementations, the series of acts 500 includes receiving a data object in response to the HTTPS call that is cryptographically signed by the server certificate. In one or more implementations, the data object includes the current list of certificates. In one or more embodiments, verifying that the current list of certificates is a trusted list comprises determining that the server certificate used to cryptographically sign the received data object is included within the client list.

As further shown, the series of acts 500 includes an act 550 of generating an updated client list based on verifying that the current list is valid. For example, in one or more embodiments, the act 550 involves generating an updated client list including the current list of certificates based on verifying that the current list of certificates is a trusted list.

In one or more embodiments, the series of acts 500 includes determining that the server certificate is included within the updated client list. Further, the series of acts 500 may include initiating or continuing a trusted session between the client and the server instance based on determining that the server certificate is included within the updated client list.

FIG. 6 illustrates a series of acts 600 for passively updating a client list of certificates in accordance with one or more embodiments described herein. As shown in FIG. 6, the series of acts 600 may include an act 610 of providing a request for a current list of server certificates from a discovery endpoint. For example, in one or more embodiments, the act 610 involves providing, to a discovery endpoint, a request for a current list of certificates associated with a server instance. In one or more embodiments, providing the request for the current list of certificates is based on a setting of the client to passively generate and provide requests for the current list of certificates accessible to the discovery endpoint.

As further shown, the series of acts 600 includes an act 620 of verifying that the current list of server certificates is a trusted list of server certificates associated with a server instance. For example, in one or more embodiments, the act 620 involves verifying that the current list of certificates associated is a trusted list of certificates associated with the server instance by determining that the current list of certificates received from the discovery endpoint has been signed by at least one server certificate included within a client list of one or more server certificates where the client list includes a local list of server certificates accessible to a client.

As further shown, the series of acts 600 may include an act 630 of generating an updated client list based on verifying that the current list is trusted. For example, in one or more embodiments, the act 630 involves generating an updated client list including the current list of certificates based on verifying that the current list of certificates is a trusted list.

As further shown, the series of acts 600 may include an act 640 of receiving a call response from the server instance signed by a server certificate included within the updated client list. For example, in one or more embodiments, the act 640 includes receiving, from the server instance, a call response including a server certificate included within the updated client list. In one or more embodiments, the server certificate included within the call response is not included within the client list prior to generating the updated client list. As further shown, the series of acts 600 may include an act 650 of initiating a trusted session between a client and the server instance based on determining that the server certificate is included within the updated client list.

In one or more embodiments, providing the request for the current list includes providing a hypertext transfer protocol secure (HTTPS) call to the discovery endpoint. In one or more implementations, the series of acts 600 further includes receiving, from the discovery endpoint, a data object in response to the HTTPS call that is cryptographically signed by a server certificate. The data object may include a current list of certificates. In one or more embodiments, verifying that the current list of certificates is a trusted list includes determining that the server certificate used to cryptographically sign the received data object is included within the client list of one or more server certificates.

Figure 7:
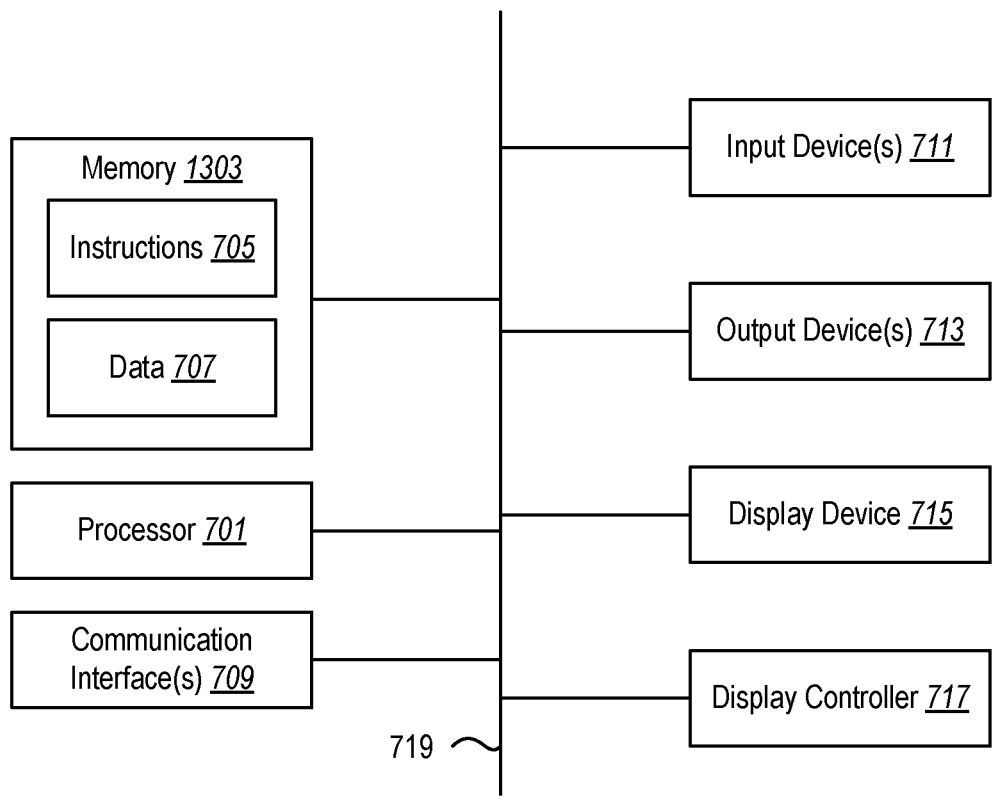
FIG. 7 illustrates certain components that may be included within an example computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method performed by a discovery endpoint on a computing device, the method comprising:
    providing, from the discovery endpoint to a client, an initial client list of one or more server certificates associated with verifying an identify of a server instance;
    generating, at the discovery endpoint, a current list of server certificates based on the initial client list and a new server certificate received from the server instance, the new server certificate being a server certificate currently in use by the server instance;
    receiving, at the discovery endpoint from the client, a request for the current list of server certificates associated with verifying the identity of the server instance; and
    providing, from the discovery endpoint to the client responsive to the request for the current list, a data object including the current list of server certificates, the data object being cryptographically signed by a server certificate from the one or more server certificates of the initial client list.

2. The method of claim 1, wherein the initial client list corresponds to a list of valid server certificates for the server instance corresponding to an initiation of a session between the client and the server instance.

3. The method of claim 1, wherein the initial client list corresponds to a previous iteration of the current list of server certificates prior to generating the current list of server certificates.

4. The method of claim 1, wherein the new server certificate is a server certificate issued to the server instance by a certificate authority.

5. The method of claim 1, wherein the request for the current list is based on the client device receiving the new server certificate from the server instance and failing to identify the new server certificate within the initial client list previously provided to the client.

6. The method of claim 1, further comprising generating the data object by cryptographically signing the data object with the server certificate included within the initial client list.

7. The method of claim 1, wherein the request for the current list is a hypertext transfer protocol secure (HTTPS) call, and wherein the data object is provided in response to the HTTPS call.

8. The method of claim 1, wherein the initial client list includes a root list of one or more X.509 v3 digital certificates owned or previously owned by the server instance, and wherein the updated client list includes the root list of one or more X.509 v3 digital certificates and one or more additional X.509 v3 digital certificates associated with the server instance.

9. A method performed by a server device having a discovery endpoint and a server instance implemented thereon, the method comprising:
    providing, from the server device to a client, an initial client list of one or more server certificates trusted by the client and associated with verifying an identity of a server instance;
    providing, from the server device to the client responsive to a session initiation request, a session request response including a current server certificate currently in use by the server instance, the current server certificate being associated with verifying the identity of the server instance;
    receiving, at the server device from the client, a request for a current list of server certificates associated with verifying the identity of the server instance, the current list of server certificates being an updated list of server certificates; and
    providing, from the server device to the client, a data object including the current list of server certificates, the data object being cryptographically signed by a server certificate from the one or more server certificates from the initial client list.

10. The method of claim 9, wherein the initial client list corresponds to a list of valid server certificates for the server instance corresponding to an initiation of a session between the client and the server instance.

11. The method of claim 9, wherein the initial client list corresponds to a previous iteration of the current list of server certificates prior to updating the current list of server certificates to include the current server certificate.

12. The method of claim 9, wherein the current server certificate is a server certificate issued to the server instance by a certificate authority.

13. The method of claim 9, wherein the request for the current list is based on the client device receiving the current certificate within the session request response and failing to identify the current certificate within the initial client list previously provided to the client.

14. The method of claim 9, further comprising generating the data object by cryptographically signing the data object with the certificate included within the initial client list.

15. The method of claim 9, wherein the request for the current list is a hypertext transfer protocol secure (HTTPS) call, and wherein the data object is provided in response to the HTTPS call.

16. The method of claim 9, wherein the initial client list includes a root list of one or more X.509 v3 digital certificates owned or previously owned by the server instance, and wherein the current list of server certificates includes the root list of one or more X.509 v3 digital certificates and one or more additional X.509 v3 digital certificates associated with the server instance.

17. A system, comprising:
   at least one processor;
   memory in electronic communication with the at least one processor; and
   instructions stored in the memory, the instructions being executable by the at least one processor to cause a discovery endpoint to:
      provide, to a client, an initial client list of one or more server certificates associated with verifying an identify of a server instance;
      generate a current list of server certificates based on the initial client list and a new server certificate received from the server instance, the new server certificate being a server certificate currently in use by the server instance;
      receiver, from the client, a request for the current list of server certificates associated with verifying the identity of the server instance; and
      provide, to the client responsive to the request for the current list, a data object including the current list of server certificates, the data object being cryptographically signed by a server certificate from the one or more server certificates of the initial client list.

18. The system of claim 17, wherein the initial client list corresponds to a list of valid server certificates for the server instance corresponding to an initiation of a session between the client and the server instance.

19. The system of claim 17, further comprising instructions being executable by the at least one processor to cause the discover endpoint to generate the data object by cryptographically signing the data object with the server certificate included within the initial client list.

20. The system of claim 17, wherein the request for the current list is a hypertext transfer protocol secure (HTTPS) call, and wherein the data object is provided in response to the HTTPS call.

* * * * *